UNITED STATES PATENT OFFICE.

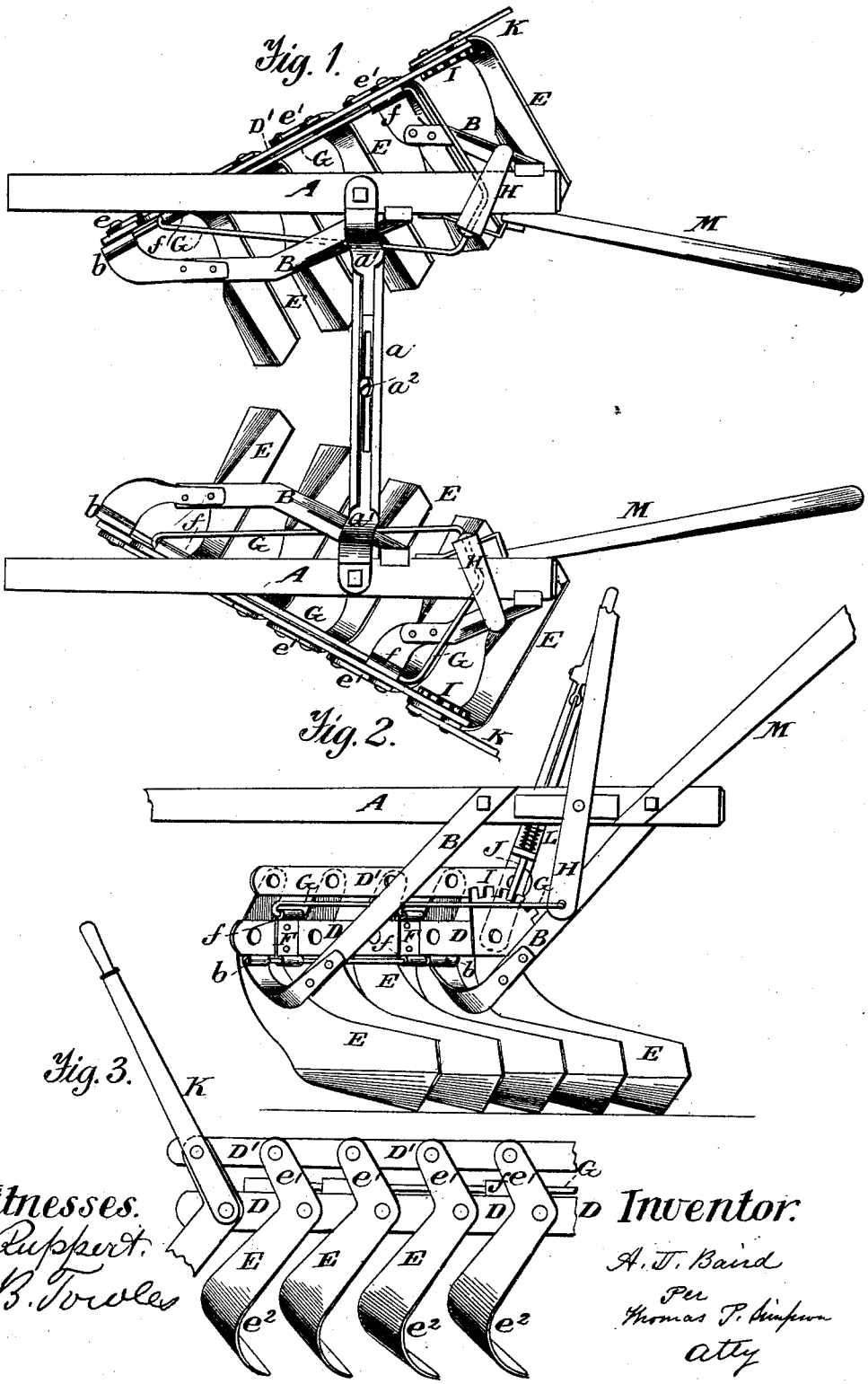

ANDREW J. BAIRD, OF VAN ORIN, ASSIGNOR OF ONE-HALF TO M. BUHLER, OF LAMOILLE, ILLINOIS.

CULTIVATOR OR PLOW.

SPECIFICATION forming part of Letters Patent No. 346,139, dated July 27, 1886.

Application filed March 15, 1886. Serial No. 195,282. (No model.)

*To all whom it may concern:*

Be it known that I, ANDREW J. BAIRD, a citizen of the United States, residing at Van Orin, in the county of Bureau and State of Illinois, have invented certain new and useful Improvements in Cultivators or Plows Adjustable for the Early or Late Working of Crops; and I do declare the following to be a full, clear, and exact description of the invention such as will enable others skilled in the art to which it appertains to make and use the same, reference being had to the accompanying drawings, and to the letters and figures of reference marked thereon, which form a part of this specification.

The invention will first be described in connection with the drawings, and then clearly pointed out in the claims.

Figure 1 of the drawings is a plan view; Fig. 2, a rear view in perspective, and Fig. 3 a front elevation.

In the drawings, A A represent beams connected by the adjustable coupling-plates $a\ a'$, one being slotted and held at any point on the other by a clamp-screw, $a^2$.

B B are bars attached at one end to the bars A A, and provided at the other end with an eye, $b$. The rod C turns in the eyes $b\ b$ of said bars.

D is a plate, to which are attached the blades E, and on which are secured the short crossing eye-plates F F, the bottom eyes, $f\ f$, serving to clamp the eye-rod C, while the top ones receive the hooks of the rods G G, that connect with the hand-lever H.

I is an arc shaped rack-bar, made fast to the plate D, so as to receive the pawl J, actuated by a spring, L, and placed on the stop-lever K.

The blades E are made in the shape of elbow-levers; are pivoted at $e$ near the vertex of their angle, and have their short arms $e'$ pivoted to the plate D', which is connected with the stop-lever K. The blades may thus be adjusted at any suitable angle to the earth.

The long arm $e^2$ of the blade is curved, so as to form the part which acts upon the soil.

The two sections of my cultivator are alike, except that they are right and left, so as to stand with respect to each other as indicated in Fig. 1 of the drawings.

Handles M M may be provided for holding and steadying the two sections, or they may be attached to a riding-plow.

These plows or cultivators may be used as follows: When the plants are young and small, the blades are set nearly flat, so that they may break the top crust of the soil and cut the weeds without covering the plants in the rows. At the next working the blades are raised considerably higher, and at the last working they are set up nearly or quite straight. When the ground is hard, lumpy, and full of stalks the setting-lever is used to elevate the blades in front, so that they will prevent clogging by cutting the stalks, roots, or grass which may come against them.

Having thus described all that is necessary to a full understanding of my invention, what I claim as new, and desire to protect by Letters Patent, is—

1. The curved blades E, made with angled shanks, and shaped to admit of being pivoted and simultaneously turned at a greater or less angle to the earth, in the manner described.

2. The combination, with the blades E, having angular shanks, of the plates D D', one made fast and the other movable by a hand-lever, as and for the purpose set forth.

3. The combination, with the fast plate D, of the short crossing eye-plates F F, the rod C, the hook-rods G G, the hand-lever H, the stop-lever K, the spring-pawl J, and the rack-bar I, as and for the purpose specified.

In testimony whereof I affix my signature in presence of two witnesses.

ANDREW J. BAIRD.

Witnesses:
L. P. PARKS,
GEO. W. MERCER.